US012738243B1

(12) United States Patent
Ma et al.

(10) Patent No.: US 12,738,243 B1
(45) Date of Patent: Sep. 15, 2026

(54) DATA SIGNAL GENERATOR AND DISPLAY DEVICE INCLUDING THE SAME

(71) Applicant: DB GlobalChip Co., Ltd., Seongnam-si (KR)

(72) Inventors: Pyungsik Ma, Daejeon (KR); Ho-yong Jung, Yongin-si (KR); Cheonwi Park, Suwon-si (KR); Hee-joon Kim, Anyang-si (KR); Jae-hong Ko, Hanam-si (KR)

(73) Assignee: DB GlobalChip Co., Ltd., Seongnam-si (KR)

( * ) Notice: Subject to any disclaimer, the term of this patent is extended or adjusted under 35 U.S.C. 154(b) by 0 days.

(21) Appl. No.: 19/307,798

(22) Filed: Aug. 22, 2025

(30) Foreign Application Priority Data

Apr. 28, 2025 (KR) ........................ 10-2025-0055394

(51) Int. Cl.
*G09G 3/36* (2006.01)

(52) U.S. Cl.
CPC ..... *G09G 3/3607* (2013.01); *G09G 2310/027* (2013.01); *G09G 2310/0291* (2013.01); *G09G 2330/045* (2013.01); *G09G 2340/16* (2013.01)

(58) Field of Classification Search
CPC ........... G09G 3/3607; G09G 2310/027; G09G 2310/0264; G09G 2310/0291; G09G 2310/0294; G09G 2330/045; G09G 2340/16; G09G 2340/0428; G09G 3/2007; G09G 3/32; G09G 3/2096; G09G 2300/0842; G09G 2310/08; G09G 2360/12; G09G 2320/0666; G09G 2320/0257
See application file for complete search history.

(56) References Cited

U.S. PATENT DOCUMENTS

2006/0262069 A1 11/2006 Do et al.
2007/0268524 A1* 11/2007 Nose .................... G09G 3/2007 358/1.9
2008/0062163 A1* 3/2008 Uchida ................ G09G 3/3648 345/214

(Continued)

FOREIGN PATENT DOCUMENTS

KR 1020180066313 A 6/2018
KR 102287759 B1 8/2021

(Continued)

*Primary Examiner* — Vinh T Lam

(74) *Attorney, Agent, or Firm* — Seed Intellectual Property Law Group LLP

(57) ABSTRACT

A data signal generator is provided. The data signal generator includes: a grayscale data generator configured to output a first data signal and a second data signal; an input data comparator configured to output a first control signal or a second control signal according to a condition; a first output unit; and a second output unit. The condition is based on a change between a first previous data signal and a second previous data signal in a previous line-time, and a first data signal and a second data signal in a current line-time. The first control signal causes the first output unit and the second output unit to perform a first operation. The second control signal causes the first output unit and the second output unit to perform both the first operation and a second operation. This structure enables signal modification in response to grayscale changes between line-times.

16 Claims, 9 Drawing Sheets

(56) References Cited

U.S. PATENT DOCUMENTS

| | | | | |
|---|---|---|---|---|
| 2010/0164996 | A1* | 7/2010 | Tomizawa | G09G 3/3648 345/213 |
| 2017/0256211 | A1* | 9/2017 | Miyata | G09G 3/3618 |
| 2020/0013334 | A1* | 1/2020 | Kang | G09G 3/3266 |
| 2020/0143733 | A1* | 5/2020 | Kim | G09G 3/2018 |
| 2020/0320922 | A1* | 10/2020 | Ko | G09G 3/3233 |
| 2020/0388224 | A1* | 12/2020 | Holsteen | G09G 3/20 |
| 2024/0021130 | A1* | 1/2024 | Ha | G09G 3/3291 |
| 2025/0292719 | A1* | 9/2025 | Pyun | G09G 3/3233 |

FOREIGN PATENT DOCUMENTS

| | | | |
|---|---|---|---|
| KR | 20230001623 | A | 1/2023 |
| KR | 102586777 | B1 | 10/2023 |
| KR | 1020240009578 | A | 1/2024 |

* cited by examiner

| | $DS_m$ | $DS_{m-1}$ | ··· | $DS_2$ | $DS_1$ |
|---|---|---|---|---|---|
| Line 1 | 0 | 0 | ··· | 0 | 0 |
| Line 2 | 255 | 255 | ··· | 255 | 255 |
| Line 3 | 0 | 0 | ··· | 0 | 0 |

*FIG. 4*

DATA SIGNAL GENERATOR AND DISPLAY DEVICE INCLUDING THE SAME

CROSS-REFERENCE TO RELATED APPLICATION

This application claims priority under 35 U.S.C § 119 to Korean Patent Application No. 10-2025-0055394 filed on Apr. 28, 2025, in the Korean Intellectual Property Office, the entire contents of which are hereby incorporated by reference.

BACKGROUND

Technical Field

The present disclosure relates to a data signal generator and a display device including the same, and more particularly, to a data signal generator that compares the output of grayscale data and outputs a modified data signal to a pixel array according to a comparison result, and a display device including the same.

Description of the Related Art

The content described in this section simply provides background information for the present embodiment and does not constitute the prior art.

Recently, as the size of display devices (e.g., liquid crystal display devices) has increased, the required resolution has also increased. When the resolution increases, it becomes necessary to express more than 10 bits of grayscale per color. Accordingly, the amount of driving current that a data driver (e.g., a source driver) must supply to the panel of the display device increases.

BRIEF SUMMARY

It has been observed that increased current consumption by the data driver can result in increased heat generation in a buffer of a channel (e.g., a data line), potentially leading to buffer malfunction. Accordingly, various embodiments described herein are directed to a technology that enables the supply of a large driving current while reducing heat generation in a large-sized display device.

For example, the subject matter relates to a data signal generator and a display device that control heat generation and power consumption by modifying the way grayscale data is delivered to a pixel array. A comparator monitors changes in grayscale values between consecutive line times. When specific transitions are detected, such as from the lowest grayscale value to the highest or from the highest to the lowest, it generates control signals that alter the behavior of output units responsible for driving the data lines.

Depending on the detected condition, two operations are selectively applied. The first operation turns on all transistors in the output buffers to increase the driving speed and reduce resistance, which helps lower heat generation. The second operation connects adjacent data lines to allow passive charge redistribution between them, reducing the need for active current driving and thereby decreasing overall power consumption.

This approach applies these operations only when certain grayscale transitions occur, avoiding unnecessary circuit activity. By combining temporal signal comparison, selective activation of buffer circuitry, and passive charge equalization between data lines, the described structure provides an effective method for managing thermal load and power efficiency in high-resolution display devices.

Various embodiments of the present disclosure provide a data signal generator capable of reducing an amount of heat generation, and a display device including the same.

The technical benefits of the present disclosure are not limited to the above-mentioned benefits, and other advantages of the present disclosure that are not mentioned will be understood by the following description and will be more clearly understood by embodiments of the present disclosure. In addition, it will be easy to see that the objects and advantages of the present disclosure may be realized by the means and combinations thereof disclosed in the claims.

According to some aspects of the disclosure, a data signal generator comprising: a grayscale data generator configured to output a plurality of data signals including a first data signal and a second data signal; an input data comparator configured to output one of a first control signal and a second control signal according to a condition, based on the first data signal and the second data signal; a first output unit configured to receive one of the first control signal and the second control signal and to receive the first data signal, and to output a first output data signal to a first data line; and a second output unit configured to receive one of the first control signal and the second control signal and to receive the second data signal, and to output a second output data signal to a second data line, wherein the condition relates to a change between a first previous data signal input to the first data line and a second previous data signal input to the second data line from the grayscale data generator in a previous line-time, and the first data signal input to the first data line and the second data signal input to the second data line from the grayscale data generator in a current line-time, wherein the first control signal causes the first output unit and the second output unit to perform a first operation, and wherein the second control signal causes the first output unit and the second output unit to perform the first operation and a second operation.

According to some aspects, wherein the condition includes a first condition that causes the first control signal to be output and a second condition that causes the second control signal to be output, wherein the first condition is a case where the first previous data signal and the second previous data signal correspond to a first grayscale voltage, and the first data signal and the second data signal correspond to a second grayscale voltage, causing a change from the first grayscale voltage in a previous line-time to the second grayscale voltage in a current line-time, and wherein the second condition is a case where the first previous data signal and the second previous data signal correspond to the second grayscale voltage, and the first data signal and the second data signal correspond to the first grayscale voltage, causing a change from the second grayscale voltage in a previous line-time to the first grayscale voltage in a current line-time.

According to some aspects, wherein the first output unit and the second output unit respectively include a first buffer and a second buffer each including at least one transistor, wherein the condition includes a first condition and a second condition, wherein based on the satisfaction of the first condition, a first sub-control signal is output from the input data comparator, the first sub-control signal performing the first operation in which all of the at least one transistor included in each of the first buffer and the second buffer are turned on, and wherein the first control signal includes the first sub-control signal.

According to some aspects, wherein based on the satisfaction of the second condition, the first operation and the second operation are performed, wherein a second sub-control signal is output from the input data comparator, the second sub-control signal performing the second operation in which the first output data signal of the first data line, which is an output line of the first output unit, and the second output data signal of the second data line, which is an output line of the second output unit, are output to have the same voltage level, and wherein the second control signal includes the first sub-control signal and the second sub-control signal.

According to some aspects, wherein based on the satisfaction of the second condition, the first operation and the second operation are performed, and wherein a second sub-control signal that performs the second operation in which the first data line of the first output unit and the second data line of the second output unit are connected to each other is output from the input data comparator.

According to some aspects, wherein the first control signal includes a first sub-control signal that causes the first operation to be performed, wherein the second control signal includes the first sub-control signal and a second sub-control signal that causes the second operation to be performed, wherein the first output unit includes: a first switch group controlled by the first sub-control signal; and a first buffer controlled by an output of the first switch group.

According to some aspects, wherein the second output unit includes: a second switch group controlled by the first sub-control signal; and a second buffer controlled by an output of the second switch group.

According to some aspects, further comprising: a third switch group configured to connect a first output line of the first buffer and a second output line of the second buffer, and controlled by the second sub-control signal.

According to some aspects of the disclosure, a display device comprising: a gate driver configured to output a gate control signal; a data signal generator configured to output a data signal; a plurality of gate lines controlled by the gate control signal; a plurality of data lines to which the data signal is output; and a plurality of pixels each connected to a respective one of the plurality of gate lines and a respective one of the plurality of data lines, wherein the plurality of data lines include a first data line and a second data line, wherein the data signal generator includes: a grayscale data generator configured to output a plurality of data signals including a first data signal and a second data signal; an input data comparator configured to output one of a first control signal and a second control signal according to a condition, based on the first data signal and the second data signal; a first output unit configured to receive one of the first control signal and the second control signal and the first data signal, and to output a first output data signal to a first data line; and a second output unit configured to receive one of the first control signal and the second control signal and the second data signal, and to output a second output data signal to a second data line, wherein the condition relates to a change between a first previous data signal input to the first data line and a second previous data signal input to the second data line from the grayscale data generator in a previous line-time, and the first data signal input to the first data line and the second data signal input to the second data line from the grayscale data generator in a current line-time, wherein the first control signal causes the first output unit and the second output unit to perform a first operation, and wherein the second control signal causes the first output unit and the second output unit to perform the first operation and a second operation.

According to some aspects, wherein the condition includes a first condition that causes the first control signal to be output and a second condition that causes the second control signal to be output, wherein the first condition is a case where the first previous data signal and the second previous data signal correspond to a first grayscale voltage, and the first data signal and the second data signal correspond to a second grayscale voltage, causing a change from the first grayscale voltage in a previous line-time to the second grayscale voltage in a current line-time, and wherein the second condition is a case where the first previous data signal and the second previous data signal correspond to the second grayscale voltage, and the first data signal and the second data signal correspond to the first grayscale voltage, causing a change from the second grayscale voltage in a previous line-time to the first grayscale voltage in a current line-time.

According to some aspects, wherein the first output unit and the second output unit respectively include a first buffer and a second buffer each including at least one transistor, wherein the condition includes a first condition and a second condition, wherein based on the satisfaction of the first condition, a first sub-control signal is output from the input data comparator, the first sub-control signal performing the first operation in which all of the at least one transistor included in each of the first buffer and the second buffer are turned on, and wherein the first control signal includes the first sub-control signal.

According to some aspects, wherein based on the satisfaction of the second condition, the first operation and the second operation are performed, and wherein a second sub-control signal is output from the input data comparator, the second sub-control signal performing the second operation in which the first output data signal of the first data line, which is an output line of the first output unit, and the second output data signal of the second data line, which is an output line of the second output unit, are output to have the same voltage level, and wherein the second control signal includes the first sub-control signal and the second sub-control signal.

According to some aspects, wherein based on the satisfaction of the second condition, the first operation and the second operation are performed, and wherein a second sub-control signal that performs the second operation in which the first data line of the first output unit and the second data line of the second output unit are connected to each other is output from the input data comparator.

According to some aspects, wherein the first control signal includes a first sub-control signal that causes the first operation to be performed, wherein the second control signal includes the first sub-control signal and a second sub-control signal that causes the second operation to be performed, wherein the first output unit includes: a first switch group controlled by the first sub-control signal; and a first buffer controlled by an output of the first switch group.

According to some aspects, wherein the second output unit includes: a second switch group controlled by the first sub-control signal; and a second buffer controlled by an output of the second switch group.

According to some aspects, further comprising: a third switch group configured to connect a first output line of the first buffer and a second output line of the second buffer, and controlled by the second sub-control signal.

The data signal generator and the display device including the same according to the present disclosure may reduce the driving current and heat generation of the data driver and prevent malfunction by allowing the data driver to perform two types of operations according to changes in grayscale voltage.

In addition to the above, the specific effects of the present disclosure will be described together with the detailed description for implementing the present disclosure.

BRIEF DESCRIPTION OF THE SEVERAL VIEWS OF THE DRAWINGS

FIGS. 3 and 4 are diagrams for explaining the operation of the input data comparator of FIG. 2.

DETAILED DESCRIPTION

Figure 1:
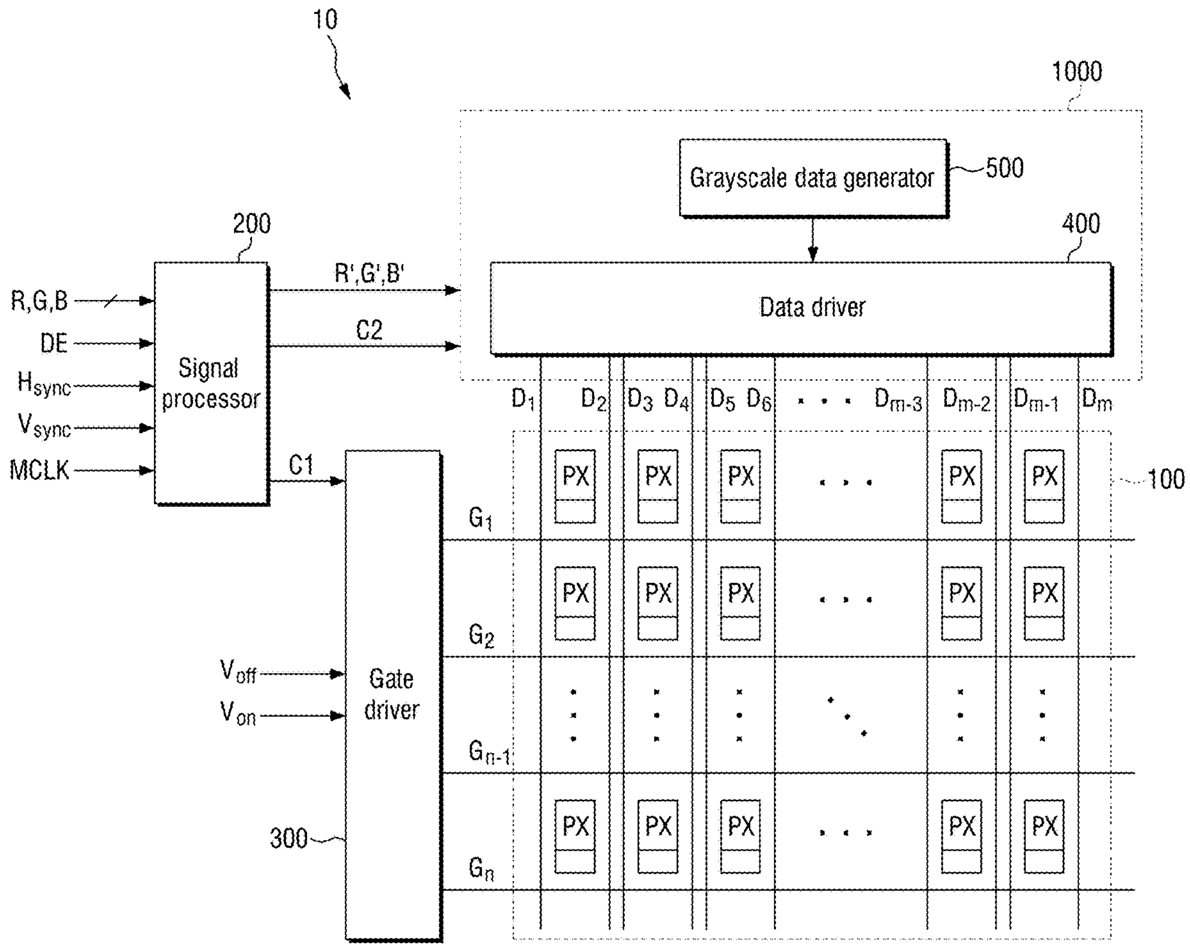
FIG. 1 is a schematic block diagram of a display device including a data signal generator according to several embodiments of the present disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc., used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc., should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

As used herein, the term "connected" is intended to have the broadest possible meaning. Specifically, the phrase "A is connected to B" encompasses both a direct connection—where no intervening components or elements are present-and an indirect connection, where one or more intermediate components or elements exist between A and B. In other words, "A is connected to B" includes both direct physical or electrical coupling and indirect coupling through one or more intervening components. Unless explicitly stated otherwise, these terms do not require direct physical or electrical contact. The term "coupled" and "in contact" should be interpreted in the same manner.

Unless being defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application. In addition, each configuration, procedure, process, method, or the like included in each embodiment of the disclosure may be shared to the extent that they are not technically contradictory to each other.

Hereinafter, a data signal generator and a display device including the same according to several embodiments of the present disclosure will be described with reference to FIGS. 1 to 6.

FIG. 1 is a schematic block diagram of a display device including a data signal generator according to several embodiments of the present disclosure.

Referring to FIG. 1, the display device 10 may include a panel 100, a signal processor 200, a gate driver 300, and a data signal generator 1000.

The panel 100 (e.g., a liquid crystal panel) may include a plurality of pixels PX. The panel 100 may be connected to a plurality of gate lines $G_1$ to $G_n$ and a plurality of data lines $D_1$ to $D_m$. Where, n and m are natural numbers.

A gate signal (e.g., gate on/off voltages Von and Voff) output from the gate driver 300 may be applied to each of the plurality of gate lines $G_1$ to $G_n$.

A data signal output from the data signal generator 1000 may be applied to each of the plurality of data lines $D_1$ to $D_m$. Details regarding the data signal generator 1000 will be described later.

Each of the plurality of gate lines $G_1$ to $G_n$ may be arranged at intervals, for example, in a row direction. Each of the plurality of data lines $D_1$ to $D_m$ may be arranged at intervals, for example, in a column direction. A pixel PX may be located at an intersection point of each of the plurality of gate lines $G_1$ to $G_n$ and each of the plurality of data lines $D_1$ to $D_m$.

A pixel PX may include, for example, a plurality of sub-pixels. For example, when two sub-pixels are included in one pixel PX, a signal having an opposite phase to each other may be applied to each of the two sub-pixels.

The signal processor 200 may include, for example, a timing controller. The signal processor 200 may receive a plurality of input control signals from the outside (e.g., a graphic controller) and may output the gate control signal C1 and the data control signal C2 based on the received plurality of input control signals.

A plurality of input control signals input to the signal processor 200 may include a vertical synchronization signal $V_{sync}$, a horizontal synchronization signal $H_{sync}$, a main clock MCLK, and a data enable signal DE.

The signal processor 200 may output a gate control signal C1 to the gate driver 300 and may output a data control signal C2 to a data driver 400 of the data signal generator 1000.

The operation of the gate driver 300 may be controlled by the gate control signal C1. The gate control signal C1 may include, for example, a signal for initiating an operation of the gate driver 300, a gate clock signal related to a timing of outputting a gate-on voltage, and an output enable signal that determines a pulse width of the gate-on voltage.

The operation of the data driver 400 of the data signal generator 1000 may be controlled by the data control signal C2. The data control signal C2 may include, for example, a signal for initiating the operation of the data driver 400.

The signal processor 200 may receive image signals R, G, and B from the outside (e.g., a graphic controller) and may output image data R', G', and B' to the data driver 400. The image data R', G', and B' may be data signals obtained by performing preprocessing on the input image signals R, G, and B. For example, the image signals R, G, and B may be signal-processed by the signal processor 200 based on operating conditions of the panel 100, and may be input to the data driver 400 as the image data R', G', and B'.

The gate driver 300 may sequentially output gate-on/off voltages Von and Voff to each of the plurality of gate lines $G_1$ to $G_n$ based on the gate control signal C1 provided from the signal processor 200.

The data driver 400 may sequentially receive the image data R', G', and B' based on the data control signal C2 provided from the signal processor 200. The data driver 400 may select, from among a plurality of data signals output from a grayscale data generator 500, data signals corresponding to the image data R', G', and B'.

Each of the plurality of data signals may be a grayscale voltage. The plurality of data signals may include a first data signal and a second data signal.

The data driver 400 may identify each of a first data signal and a second data signal through a first data line $D_m$ and a second data line $D_{m-1}$, respectively. The data driver 400 may, depending on a condition, output a first output data signal to the panel 100 through the first data line $D_m$, and output a second output data signal to the panel 100 through the second data line $D_{m-1}$. The first output data signal may be a modified data signal in which the first data signal is modified as the condition is satisfied. The second output data signal may be a modified data signal in which the second data signal is modified as the condition is satisfied.

Figure 2:
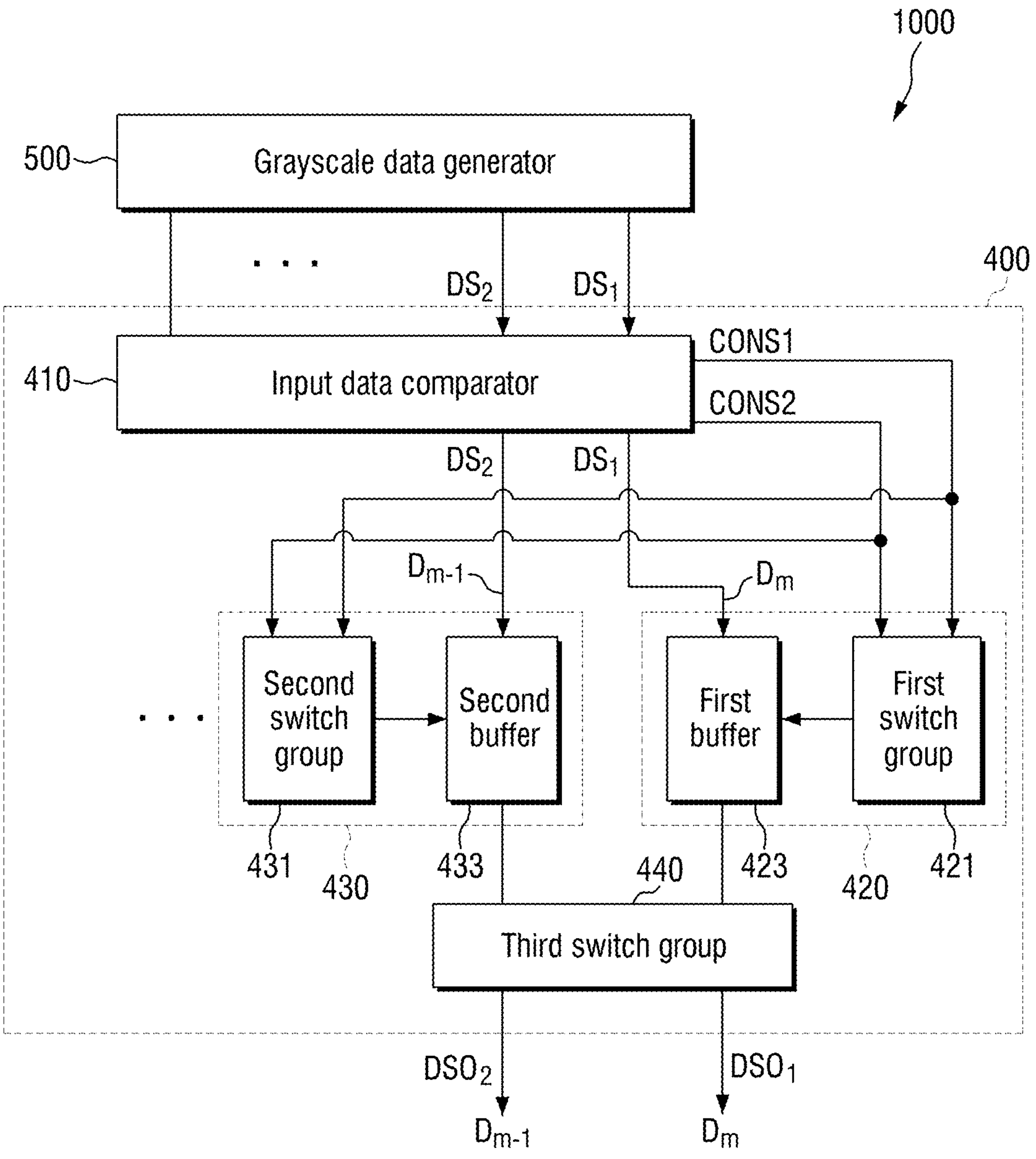
FIG. 2 is a diagram for explaining the data signal generator of FIG. 1.

FIG. 2 is a diagram for explaining the data signal generator of FIG. 1.

Referring to FIGS. 1 and 2, the data signal generator 1000 may include a grayscale data generator 500 and a data driver 400. The data driver 400 may include an input data comparator 410, a first output unit 420, a second output unit 430, and a third switch group 440

Among the plurality of data signals output from the grayscale data generator 500, a first data signal $DS_1$ may be input to the input data comparator 410 through a first data line $D_m$, and a second data signal $DS_2$ may be input through a second data line $D_{m-1}$. Although only two output units (the first output unit 420 and the second output unit 430) are illustrated in the drawing, output units may be arranged in correspondence with the number of data lines.

The input data comparator 410 may output one of a first control signal CONS1 and a second control signal CONS2 according to a condition, based on the first data signal $DS_1$ and the second data signal $DS_2$. Although the first control signal CONS1 and the second control signal CONS2 are illustrated in the drawing as being output from the input data comparator 410 through different lines, this is not limited thereto. For example, one of the first control signal CONS1 and the second control signal CONS1 may be output from the input data comparator 410 through a single line.

Figure 3:
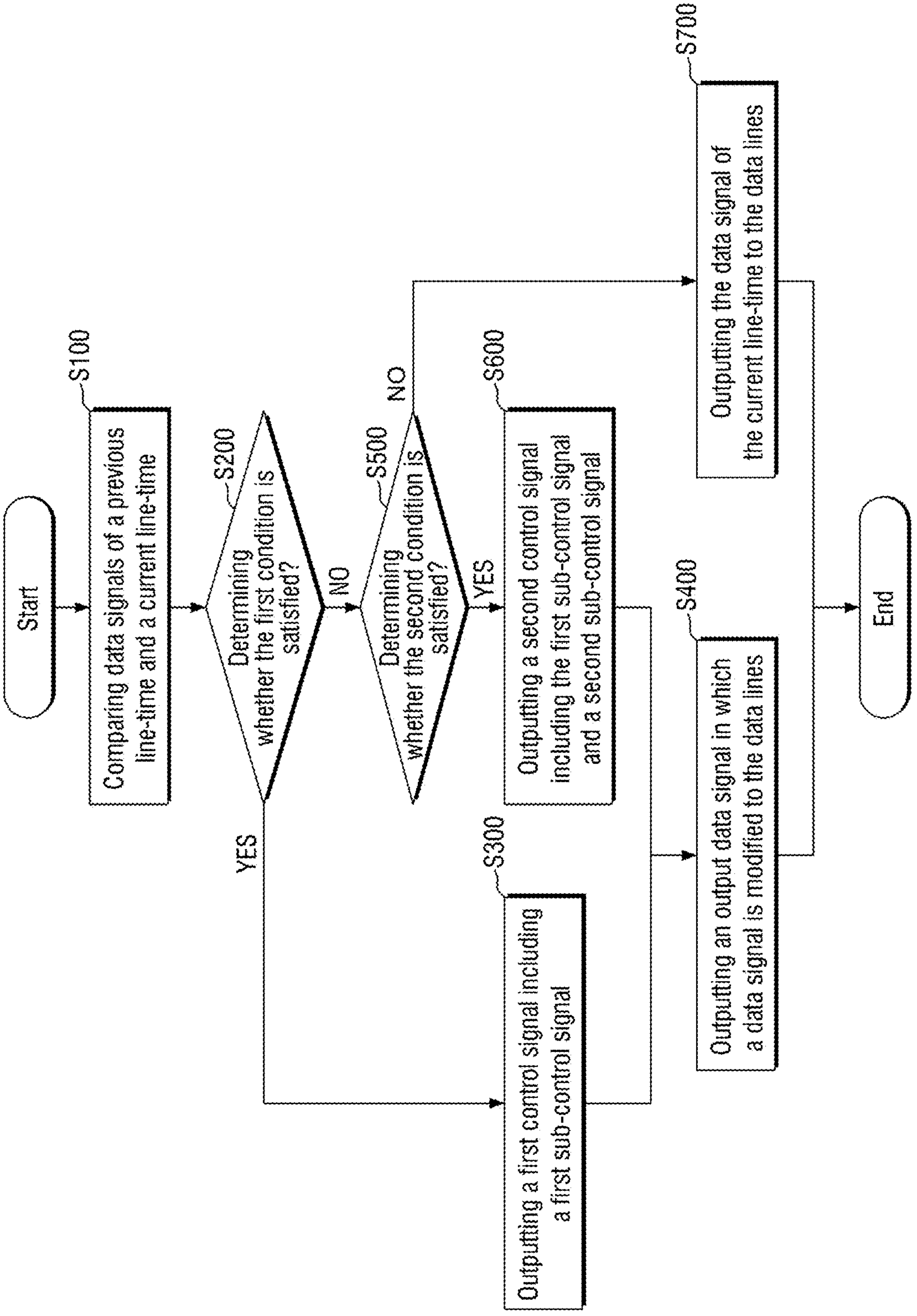

FIGS. 3 and 4 are diagrams for explaining the operation of the input data comparator of FIG. 2.

Referring to FIGS. 2 and 3, the input data comparator 410 may first determine whether a condition is satisfied in order to output one of the first control signal CONS1 and the second control signal CONS2. If a first condition is satisfied, the input data comparator 410 may output the first control signal CONS1, and if a second condition is satisfied, the input data comparator 410 may output the second control signal CONS2.

The input data comparator 410 may compare a data signal of a previous line-time and a data signal of a current line-time in order to determine whether a condition is satisfied (S100).

The condition may relate to a change between a previous data signal of the previous line-time and a data signal of the current line-time. The input data comparator 410 may compare a plurality of previous data signals applied to each of the plurality of data lines $D_1$ to $D_m$ in the previous line-time and a plurality of data signals applied to each of the plurality of data lines $D_1$ to $D_m$ in the current line-time. For example, the input data comparator 410 may compare a first previous data signal and a second previous data signal of the previous line-time with a first data signal and a second data signal of the current line-time. The first previous data signal and the first data signal may be signals applied to the first data line $D_m$, and the second previous data signal and the second data signal may be signals applied to the second data line $D_{m-1}$.

The previous line-time may be, for example, a line-time that occurred prior to the current line-time, in which a gate-on voltage Von is applied from the gate driver 300 to a first gate line $G_1$ of the panel 100, thereby turning on a plurality of transistors connected to the first gate line $G_1$. The current line-time may relate to, for example, a current operation of the display device 10, in which a gate-on voltage Von is applied from the gate driver 300 to a second gate line $G_2$ of the panel 100, thereby turning on a plurality of transistors connected to the second gate line $G_2$.

The condition may include a first condition and a second condition.

The first condition may be a condition that is satisfied when, during the previous line-time, a plurality of previous data signals applied to each of the plurality of data lines $D_1$ to $D_m$ are first grayscale voltages, and during the current line-time, a plurality of data signals applied to each of the plurality of data lines $D_1$ to $D_m$ change to second grayscale voltages. The first grayscale voltage may be, for example, a voltage corresponding to a black grayscale, which is the lowest grayscale (e.g., 0 grayscale). The second grayscale voltage may be, for example, a voltage corresponding to a white grayscale, which is the highest grayscale (e.g., 255 grayscale). For example, the input data comparator 410 may determine that the first condition is satisfied when the first previous data signal and the second previous data signal correspond to the first grayscale voltage in the previous line-time, and the first data signal and the second data signal correspond to the second grayscale voltage in the current line-time, thereby changing from the first grayscale voltage to the second grayscale voltage.

The second condition may be a condition that is satisfied when, during the previous line-time, a plurality of previous data signals applied to each of the plurality of data lines $D_1$ to $D_m$ are the second grayscale voltage, and during the current line-time, a plurality of data signals applied to each of the plurality of data lines $D_1$ to $D_m$ change to the first grayscale voltage. For example, the input data comparator 410 may determine that the second condition is satisfied when a first previous data signal and a second previous data signal correspond to the second grayscale voltage in the previous line-time, and a first data signal and a second data signal correspond to the first grayscale voltage in the current line-time, thereby changing from the second grayscale voltage to the first grayscale voltage.

Referring to FIG. 4, when Line 1 is the previous line-time and Line 2 is the current line-time, previous data signals $DS_m$, $DS_{m-1}$, . . . , $DS_2$, and $DS_1$ in the previous line-time (Line 1) are all the first grayscale voltage (e.g., 0 grayscale), and data signals $DS_m$, $DS_{m-1}$, . . . , $DS_2$, and $DS_1$ in the current line-time (Line 2) are all the second grayscale voltage (e.g., 255 grayscale). The input data comparator 410 may determine that the first condition is satisfied based on the fact that the grayscale voltages have changed from the first grayscale voltage to the second grayscale voltage during the transition from the previous line-time (Line 1) to the current line-time (Line 2).

If Line 2 is the previous line-time and Line 3 is the current line-time, previous data signals $DS_m$, $DS_{m-1}$, . . . , $DS_2$, and $DS_1$ in the previous line-time (Line 2) are all the second grayscale voltage (e.g., 255 grayscale), and data signals $DS_m$, $DS_{m-1}$, . . . , $DS_2$, and $DS_1$ in the current line-time (Line 3) are all the first grayscale voltage (e.g., 0 grayscale). The input data comparator 410 may determine that the second condition is satisfied based on the fact that the grayscale voltages have changed from the second grayscale voltage to the third grayscale voltage during the transition from the previous line-time (Line 2) to the current line-time (Line 3).

Referring again to FIGS. 2 and 3, the input data comparator 410 may determine whether the first condition is satisfied (S200). Based on the satisfaction of the first condition (e.g., at S200), the input data comparator 410 may output a first control signal including a first sub-control signal (S300).

The first control signal CONS1 may be a signal that causes the first output unit 420 and the second output unit 430 to perform a first operation. The first operation will be described below with reference to FIG. 5.

The input data comparator 410 may output an output data signal in which a data signal is modified to the data lines (S400). As the first output unit 420 and the second output unit 430 perform the first operation in response to the first control signal CONS1, the input data comparator 410 may output an output data signal in which a data signal is modified to the data lines.

The data lines through which output data signals are output may be output lines of respective output units. For example, the output line of the first output unit 420 may be the first data line $D_m$, and the output line of the second output unit 430 may be the second data line $D_{m-1}$.

The output data signal may be a modified signal of the data signal received from the grayscale data generator 500 when a condition is satisfied. Alternatively, the output data signal may be the same as the data signal received from the grayscale data generator 500 when the condition is not satisfied.

For example, the first output data signal $DSO_1$, which is applied to a pixel PX through the first data line $D_m$, may be a modified signal of the first data signal $DS_1$ based on the first control signal CONS1 and may pass through the first output unit 420. For example, the second output data signal $DSO_2$ is a signal applied to a pixel PX through the second data line $D_{m-1}$, and may be a modified signal in which the second data signal $DS_2$ is modified through the second output part 430 based on the first control signal CONS1.

Based on the determination that the first condition is not satisfied (No at S200), the input data comparator 410 may determine whether the second condition is satisfied (S500). Based on the satisfaction of the second condition (Yes at S500), the input data comparator 410 may output a second control signal including a first sub-control signal and a second sub-control signal (S600).

The second control signal CONS2 may be a signal that causes the first output unit 420 and the second output unit 430 to perform both a first operation and a second operation. The second operation will be described below with reference to FIG. 5.

The input data comparator 410 may output an output data signal in which a data signal is modified to the data lines (S400). As the first output unit 420 and the second output unit 430 perform a first operation and a second operation in response to the second control signal CONS2, the input data comparator 410 may output an output data signal in which a data signal is modified to the data lines.

For example, the first output data signal $DSO_1$ is a signal applied to a pixel PX through the first data line $D_m$, and may be a modified signal in which the first data signal $DS_1$ is modified through the first output part 420 based on the second control signal CONS2. For example, the second output data signal $DSO_2$ is a signal applied to a pixel PX through the second data line $D_{m-1}$, and may be a modified signal in which the second data signal $DS_2$ is modified through the second output part 430 based on the second control signal CONS2.

Based on the determination that the second condition is not satisfied (No at S500), the input data comparator 410 may output the data signal of the current line-time to the data lines (S700). In this case, neither the first control signal CONS1 nor the second control signal CONS2 may be output.

The first output data signal $DSO_1$ is a signal applied to a pixel PX through the first data line $D_m$, may be a signal in which the first data signal $DS_1$ is output through the first output unit 420. For example, the second output data signal $DSO_2$ is a signal applied to a pixel PX through the second data line $D_{m-1}$, may be a signal in which the second data signal $DS_2$ is output through the second output unit 430. In this case, each of the first data signal $DS_1$ and the second data signal $DS_2$ may be output without being modified by the first output unit 420 and the second output unit 430.

Referring again to FIGS. 1 and 2, one of the first control signal CONS1 and the second control signal CONS2 output from the input data comparator 410 may be input to the first output unit 420 and the second output unit 430.

The first output unit 420 may include a first switch group 421 and a first buffer 423. The first output unit 420 may receive one of the first control signal CONS1 and the second control signal CONS2 and the first data signal $DS_1$, and may output a first output data signal $DSO_1$ to a pixel PX through a first output line of the first buffer 423. The first output line may be, for example, the first data line $D_m$.

The second output unit 430 may include a second switch group 431 and a second buffer 433. The second output unit 430 may receive one of the first control signal CONS1 and the second control signal CONS2 and the second data signal $DS_2$, and may output a second output data signal $DSO_2$ to a pixel PX through a second output line of the second buffer 433. The second output line may be, for example, the second data line $D_{m-1}$.

Figure 5:
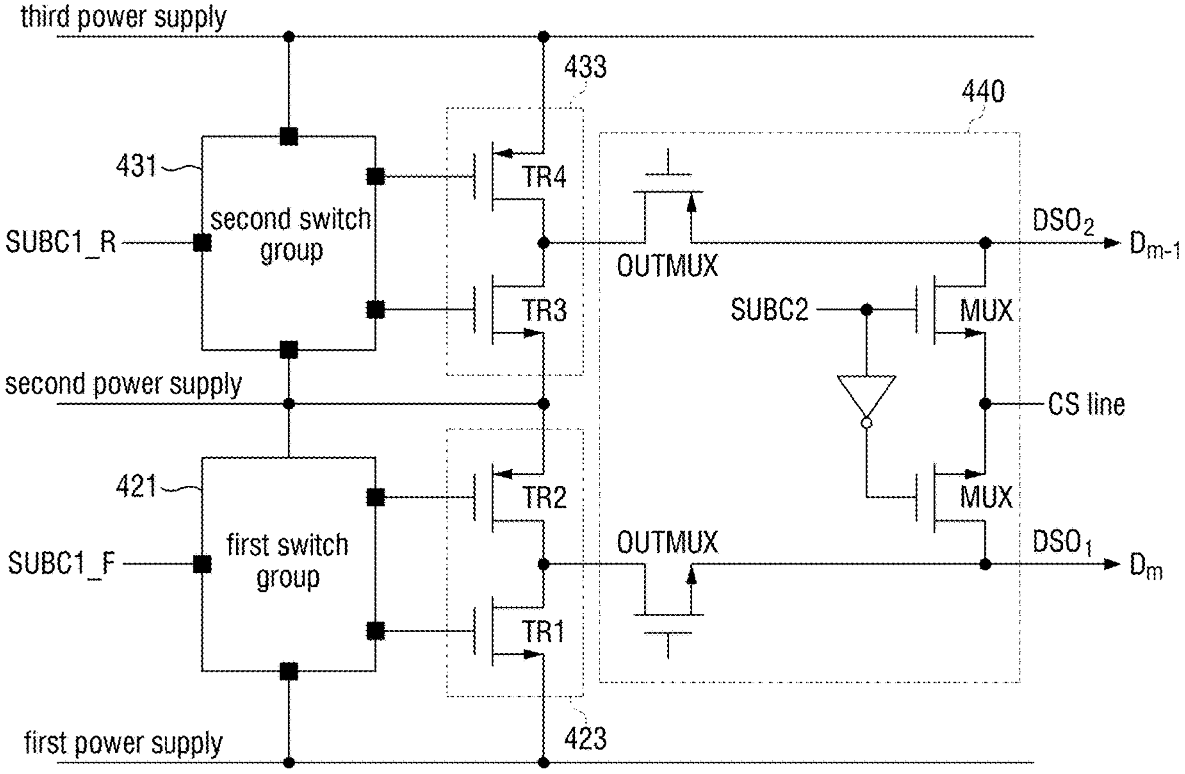
FIG. 5 is a diagram for explaining the first output unit and the second output unit of FIG. 2.

FIG. 5 is a diagram for explaining the first output unit and the second output unit of FIG. 2.

Referring to FIGS. 2 and 5, the first switch group 421 may be controlled by first sub-control signals SUBC1_R and SUBC1_F. The first switch group 421 may be arranged between a first power supply and a second power supply. The first switch group 421 may be, for example, a pull-down switch.

The first sub-control signals SUBC1_R and SUBC1_F may include two types of sub-control signals. The two types of sub-control signals may be signals having the same magnitude but opposite phases.

The first buffer 423 may be controlled by an output of the first switch group 421. The first buffer 423 may include at least one transistor (e.g., TR1 and TR2). An output of the first switch group 421 may be applied to a gate of at least one transistor (e.g., TR1 and TR2) of the first buffer 423, and may control the at least one transistor (e.g., TR1 and TR2).

The second switch group 431 may be controlled by the first sub-control signals SUBC1_R and SUBC1_F. The second switch group 431 may be arranged between a second power supply and a third power supply. The second switch group 431 may be, for example, a pull-up switch.

The second buffer 433 may be controlled by an output of the second switch group 431. The second buffer 433 may include at least one transistor (e.g., TR3 and TR4). An output of the second switch group 431 may be applied to a gate of at least one transistor (e.g., TR3 and TR4) of the second buffer 433, and may control the at least one transistor (e.g., TR3 and TR4).

The third switch group 440 may connect a first output line (e.g., the first data line $D_m$) of the first buffer 423 and a second output line (e.g., the second data line $D_{m-1}$) of the second buffer 433, and may be controlled by a second sub-control signal SUBC2. The third switch group 440 may be arranged between the first output line (e.g., the first data line $D_m$) of the first buffer 423 and the second output line (e.g., the second data line $D_{m-1}$) of the second buffer 433. The third switch group 440 may be connected to a common source line (CS line), and may connect the first output line (e.g., the first data line $D_m$) and the second output line (e.g., the second data line $D_{m-1}$) of the second buffer 433. The third switch group 440 may include at least one transistor (e.g., MUX). At least one transistor (e.g., MUX) of the third switch group 440 may be controlled by the second sub-control signal SUBC2. The third switch group 440 may include at least one additional transistor (e.g., OUTMUX). The at least one additional transistor (e.g., OUTMUX) may be arranged between the first buffer 423 and the first output line, and may be arranged between the second buffer 433 and the second output line.

The first operation may be performed by the first control signal CONS1. When the first operation is performed, at least one transistor (e.g., TR1, TR2, TR3, and TR4) included in the first buffer 423 and the second buffer 433 may all be turned on by the first control signal CONS1. For example, when the first condition is satisfied and the first operation is performed by the first control signal CONS1, at least one transistor (e.g., TR1, TR2, TR3, and TR4) included in the first buffer 423 and the second buffer 433 may all be turned on to rapidly drive the output lines (e.g., the first data line $D_m$ and the second data line $D_{m-1}$) of each buffer under a high-current and low-resistance state. As the driving speed increases, the amount of heat generated by the first buffer 423 and the second buffer 433 may be reduced.

The first operation and the second operation may both be performed by the second control signal CONS2. When the second operation is performed, a first output data signal $DSO_1$ output to the first output line and a second output data signal $DSO_2$ output to the second output line may be output at the same voltage level. The second control signal CONS2 may include a first sub-control signal for performing the first operation and a second sub-control signal for performing the second operation.

According to the second sub-control signal, at least one additional transistor (e.g., OUTMUX) may be turned off, and two output lines having different power levels (e.g., the first data line $D_m$ and the second data line $D_{m-1}$) may be shorted by the turning-on of at least one transistor (e.g., MUX), so that a charge or discharge operation is performed between the two output lines and charges are shared. According to the second sub-control signal, the first output unit 420 and the second output unit 430 may not be driven, and as two output lines having different voltages (e.g., the first data line $D_m$ and the second data line $D_{m-1}$) are shorted, a charge or discharge operation may be performed between the two output lines without current consumption in the first output unit 420 and the second output unit 430, thereby reducing the amount of heat generation.

Figure 6:
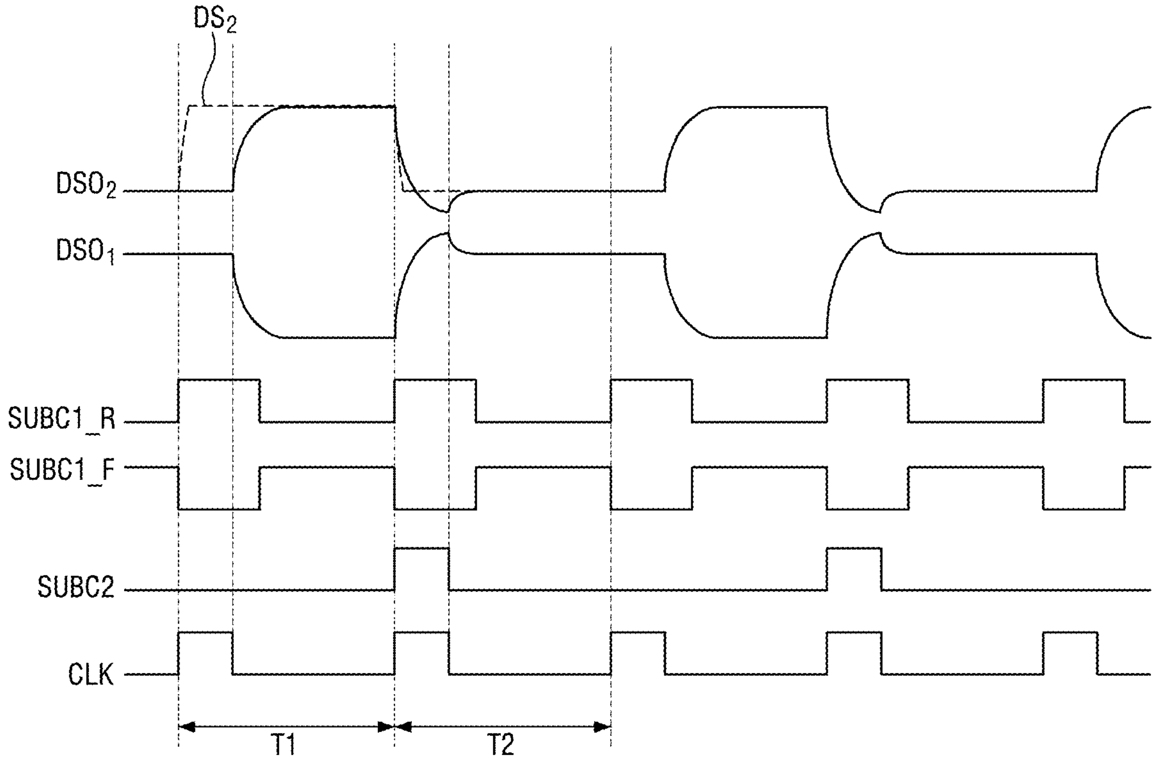
FIG. 6 is a diagram for explaining the operation of the first output unit and the second output unit of FIGS. 2 and 5.

FIG. 6 is a diagram for explaining the operation of the first output unit and the second output unit of FIGS. 2 and 5.

Referring to FIGS. 2, 5, and 6, the first control signal CONS1 may be output from the input data comparator 410 during a first interval T1, and the second control signal CONS2 may be output from the input data comparator 410 during a second interval T2.

During a first period T1, a first output data signal $DSO_1$, in which a first data signal $DS_1$ is modified by a first sub-control signal SUBC1_R or SUBC1_F, may be output, and a second output data signal $DSO_2$, in which a second data signal $DS_2$ is modified, may be output. For example, when the second data signal $DS_2$ changes from a low voltage level to a high voltage level at the falling edge of a clock CLK, the second output data signal $DSO_2$ may rapidly rise to the high voltage level, thereby reducing heat generation.

During a second period T2, a first output data signal $DSO_1$, in which a first data signal $DS_1$ is modified by a first sub-control signal SUBC1_R or SUBC1_F and a second sub-control signal SUBC2, may be output, and a second output data signal $DSO_2$, in which a second data signal $DS_2$ is modified, may be output. For example, when the second data signal $DS_2$ changes from a high voltage level to a low voltage level at the falling edge of a clock CLK, the second output data signal $DSO_2$ may rapidly fall to the low voltage level, thereby decreasing the driving range for subsequent operations and reducing heat generation.

Figure 7:
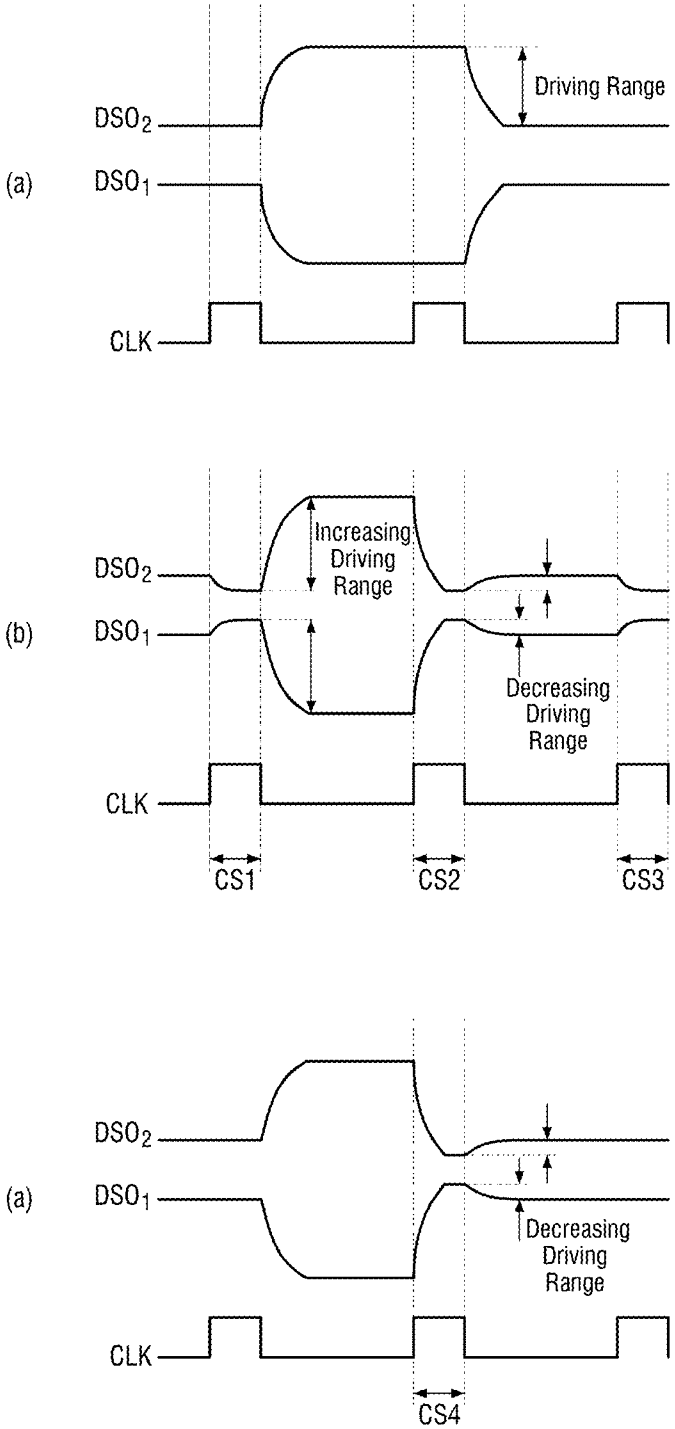
FIG. 7 is a diagram for explaining the effect of the data signal generator according to an embodiment of the present disclosure.

FIG. 7 is a diagram for explaining the effect of the data signal generator according to an embodiment of the present disclosure.

Referring to FIG. 7, (a) is a diagram showing the output of an output buffer when the input data comparator is not included, (b) is a diagram showing the output of the output buffer when the input data comparator outputs the second sub-control signal at all line-times, and (c) is a diagram showing the output of the output buffer when the data signal generator according to an embodiment of the present disclosure is included. In CS intervals (CS1, CS2, CS3, and CS4), charge and discharge operations were performed.

In case of (b), as a result of performing a second operation according to the second sub-control signal in all line-times, compared to (a), an interval in which a driving range is increased due to a first CS interval CS1 occurs, and heat generation increases. In the case of (c), the driving range decreased compared to (a), so that heat generation may be reduced. In addition, in the case of (c), when a change occurs from the highest grayscale to the lowest grayscale (e.g., the second condition), the second sub-control signal is output and the second operation is performed only in that case (e.g., the fourth CS interval CS4), so that the driving range may be decreased and heat generation may be reduced.

Hereinafter, a data signal generator and a display device including the same according to several embodiments of the present disclosure will be described with reference to FIGS. 1, 2, 3, 5, 8, and 9. For clarity of description, overlapping contents previously described are briefly mentioned or omitted.

Figure 8:
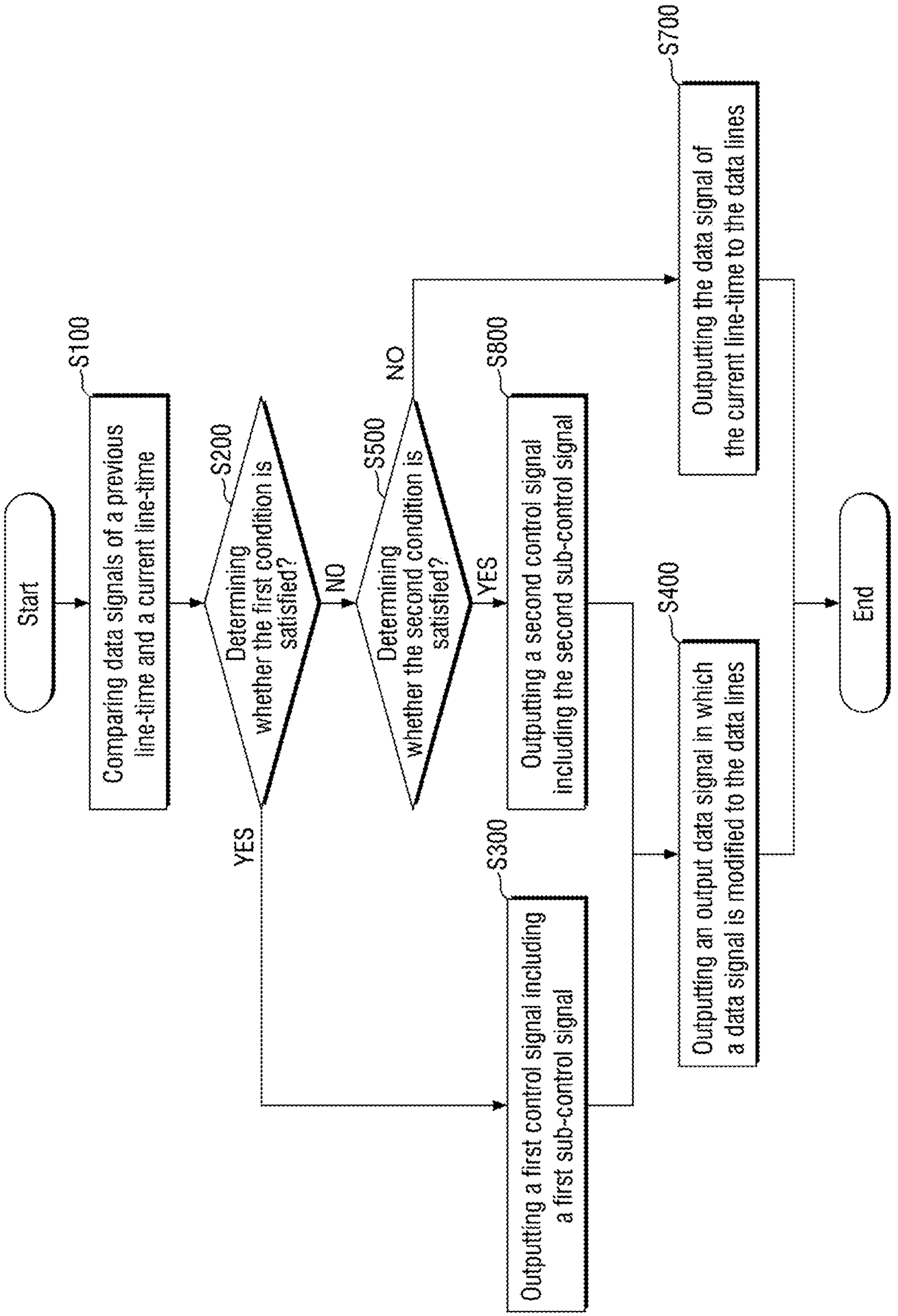
FIG. 8 is a diagram for explaining the operation of the input data comparator of FIG. 2.

FIG. 8 is a diagram for explaining the operation of the input data comparator of FIG. 2.

Referring to FIGS. 2 and 8, when the second condition is satisfied, the input data comparator 410 may output a second control signal including the second sub-control signal (S800). In some embodiments, when the second condition is satisfied, the first output unit 420 and the second output unit 430 may perform only the second operation.

Figure 9:
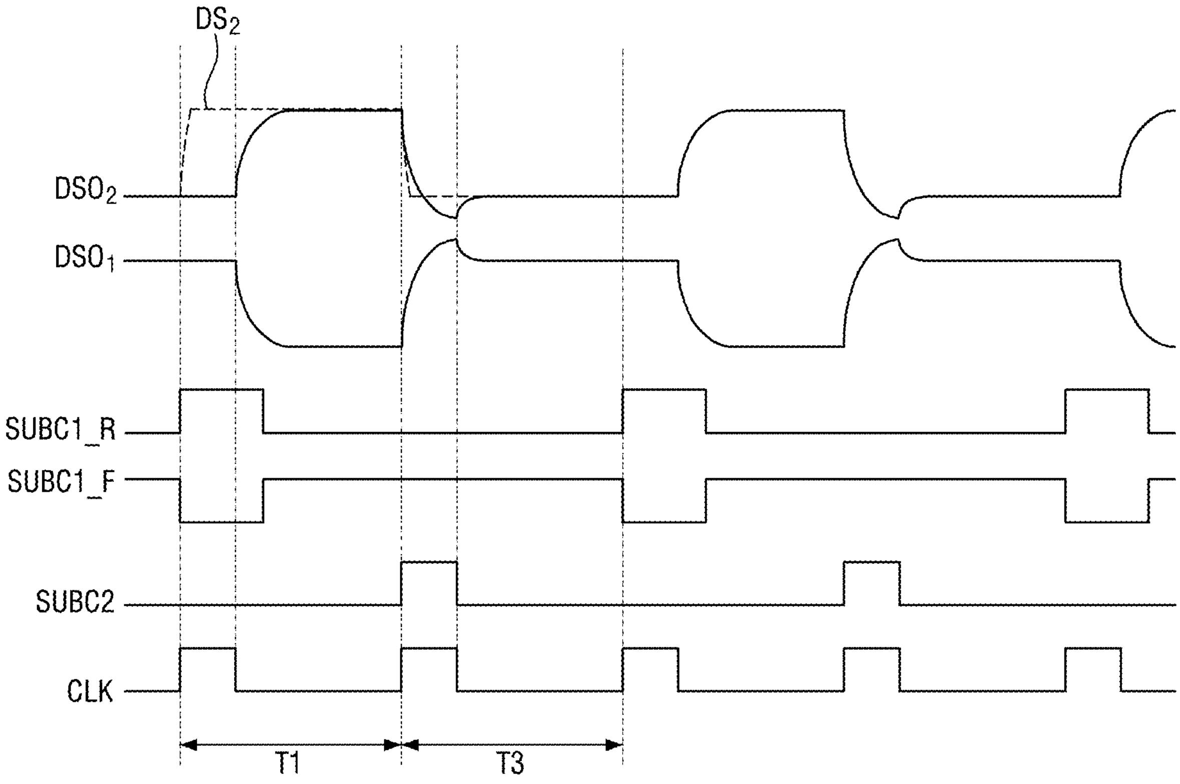
FIG. 9 is a diagram for explaining the operation of the first output unit and the second output unit of FIGS. 2 and 5.

FIG. 9 is a diagram for explaining the operation of the first output unit and the second output unit of FIGS. 2 and 5.

Referring to FIGS. 2, 5, and 9, only the second sub-control signal SUBC2 may be output from the input data comparator 410 during a third interval T3.

The term "unit" as used in this document may include a unit implemented in hardware, software, or firmware, and may be used interchangeably with terms such as logic, logic block, component, or circuit. A "unit" may be a single integrated component, a minimal unit of such a component, or a portion thereof, that performs one or more functions. For example, according to one embodiment, a module may be implemented in the form of an application-specific integrated circuit (ASIC).

According to various embodiments, each of the above-described components (e.g., units) may include a single entity or a plurality of entities. According to various embodiments, one or more of the above-described components or operations may be omitted, or one or more other components or operations may be added. Additionally or alternatively, a plurality of components (e.g., units) may be integrated into a single component. In such a case, the integrated component may perform one or more functions of each of the plurality of components in the same or similar manner as performed by the corresponding component of the plurality of components prior to integration. According to various embodiments, operations performed by a unit or another component may be executed sequentially, in parallel, repetitively, or heuristically, and one or more of the operations may be executed in a different order, omitted, or one or more other operations may be added.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A data signal generator comprising:

a grayscale data generator configured to output a plurality of data signals including a first data signal and a second data signal;

an input data comparator configured to output one of a first control signal and a second control signal according to a condition, based on the first data signal and the second data signal;

a first output unit configured to receive one of the first control signal and the second control signal and to receive the first data signal, and to output a first output data signal to a first data line; and a second output unit configured to receive one of the first control signal and the second control signal and to receive the second data signal, and to output a second output data signal to a second data line, wherein the condition relates to a change between a first previous data signal input to the first data line and a second previous data signal input to the second data line from the grayscale data generator in a previous line-time, and the first data signal input to the first data line and the second data signal input to the second data line from the grayscale data generator in a current line-time, wherein the first control signal causes the first output unit and the second output unit to perform a first operation, and wherein the second control signal causes the first output unit and the second output unit to perform the first operation and a second operation.

2. The data signal generator according to claim 1, wherein the condition includes a first condition that causes the first control signal to be output and a second condition that causes the second control signal to be output, wherein the first condition is a case where the first previous data signal and the second previous data signal correspond to a first grayscale voltage, and the first data signal and the second data signal correspond to a second grayscale voltage, causing a change from the first grayscale voltage in a previous line-time to the second grayscale voltage in a current line-time, and wherein the second condition is a case where the first previous data signal and the second previous data signal correspond to the second grayscale voltage, and the first data signal and the second data signal correspond to the first grayscale voltage, causing a change from the second grayscale voltage in a previous line-time to the first grayscale voltage in a current line-time.

3. The data signal generator according to claim 1, wherein the first output unit and the second output unit respectively include a first buffer and a second buffer each including at least one transistor, wherein the condition includes a first condition and a second condition, wherein based on the satisfaction of the first condition, a first sub-control signal is output from the input data comparator, the first sub-control signal performing the first operation in which all of the at least one transistor included in each of the first buffer and the second buffer are turned on, and wherein the first control signal includes the first sub-control signal.

4. The data signal generator according to claim 3, wherein based on the satisfaction of the second condition, the first operation and the second operation are performed, wherein a second sub-control signal is output from the input data comparator, the second sub-control signal performing the second operation in which the first output data signal of the first data line, which is an output line of the first output unit, and the second output data signal of the second data line, which is an output line of the second output unit, are output to have the same voltage level, and wherein the second control signal includes the first sub-control signal and the second sub-control signal.

5. The data signal generator according to claim 4, wherein based on the satisfaction of the second condition, the first operation and the second operation are performed, and wherein a second sub-control signal that performs the second operation in which the first data line of the first output unit and the second data line of the second output unit are connected to each other is output from the input data comparator.

6. The data signal generator according to claim 1, wherein the first control signal includes a first sub-control signal that causes the first operation to be performed, wherein the second control signal includes the first sub-control signal and a second sub-control signal that causes the second operation to be performed, wherein the first output unit includes:

a first switch group controlled by the first sub-control signal; and a first buffer controlled by an output of the first switch group.

7. The data signal generator according to claim 6, wherein the second output unit includes:

a second switch group controlled by the first sub-control signal; and a second buffer controlled by an output of the second switch group.

8. The data signal generator according to claim 7, further comprising:

a third switch group configured to connect a first output line of the first buffer and a second output line of the second buffer, and controlled by the second sub-control signal.

9. A display device comprising:

a gate driver configured to output a gate control signal;

a data signal generator configured to output a data signal;

a plurality of gate lines controlled by the gate control signal;

a plurality of data lines to which the data signal is output; and a plurality of pixels each connected to a respective one of the plurality of gate lines and a respective one of the plurality of data lines, wherein the plurality of data lines include a first data line and a second data line, wherein the data signal generator includes:

a grayscale data generator configured to output a plurality of data signals including a first data signal and a second data signal;

an input data comparator configured to output one of a first control signal and a second control signal according to a condition, based on the first data signal and the second data signal;

a first output unit configured to receive one of the first control signal and the second control signal and the first data signal, and to output a first output data signal to a first data line; and a second output unit configured to receive one of the first control signal and the second control signal and the second data signal, and to output a second output data signal to a second data line, wherein the condition relates to a change between a first previous data signal input to the first data line and a second previous data signal input to the second data line from the grayscale data generator in a previous line-time, and the first data signal input to the first data line and the second data signal input to the second data line from the grayscale data generator in a current line-time, wherein the first control signal causes the first output unit and the second output unit to perform a first operation, and wherein the second control signal causes the first output unit and the second output unit to perform the first operation and a second operation.

10. The display device according to claim 9, wherein the condition includes a first condition that causes the first control signal to be output and a second condition that causes the second control signal to be output, wherein the first condition is a case where the first previous data signal and the second previous data signal correspond to a first grayscale voltage, and the first data signal and the second data signal correspond to a second grayscale voltage, causing a change from the first grayscale voltage in a previous line-time to the second grayscale voltage in a current line-time, and wherein the second condition is a case where the first previous data signal and the second previous data signal correspond to the second grayscale voltage, and the first data signal and the second data signal correspond to the first grayscale voltage, causing a change from the second grayscale voltage in a previous line-time to the first grayscale voltage in a current line-time.

11. The display device according to claim 9, wherein the first output unit and the second output unit respectively include a first buffer and a second buffer each including at least one transistor, wherein the condition includes a first condition and a second condition, wherein based on the satisfaction of the first condition, a first sub-control signal is output from the input data comparator, the first sub-control signal performing the first operation in which all of the at least one transistor included in each of the first buffer and the second buffer are turned on, and wherein the first control signal includes the first sub-control signal.

12. The display device according to claim 11, wherein based on the satisfaction of the second condition, the first operation and the second operation are performed, and wherein a second sub-control signal is output from the input data comparator, the second sub-control signal performing the second operation in which the first output data signal of the first data line, which is an output line of the first output unit, and the second output data signal of the second data line, which is an output line of the second output unit, are output to have the same voltage level, and wherein the second control signal includes the first sub-control signal and the second sub-control signal.

13. The display device according to claim 12, wherein based on the satisfaction of the second condition, the first operation and the second operation are performed, and wherein a second sub-control signal that performs the second operation in which the first data line of the first output unit and the second data line of the second output unit are connected to each other is output from the input data comparator.

14. The display device according to claim 9, wherein the first control signal includes a first sub-control signal that causes the first operation to be performed, wherein the second control signal includes the first sub-control signal and a second sub-control signal that causes the second operation to be performed, wherein the first output unit includes:

a first switch group controlled by the first sub-control signal; and a first buffer controlled by an output of the first switch group.

15. The display device according to claim 14, wherein the second output unit includes:

a second switch group controlled by the first sub-control signal; and a second buffer controlled by an output of the second switch group.

16. The display device according to claim 15, further comprising:

a third switch group configured to connect a first output line of the first buffer and a second output line of the second buffer, and controlled by the second sub-control signal.

* * * * *